Sept. 27, 1927. 1,643,720
L. J. McKONE
CONNECTING ROD STRUCTURE
Filed Feb. 9, 1927
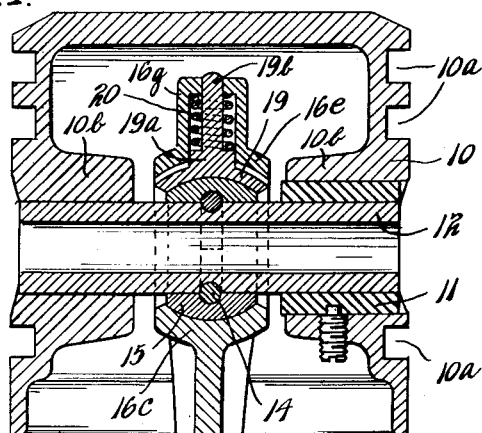
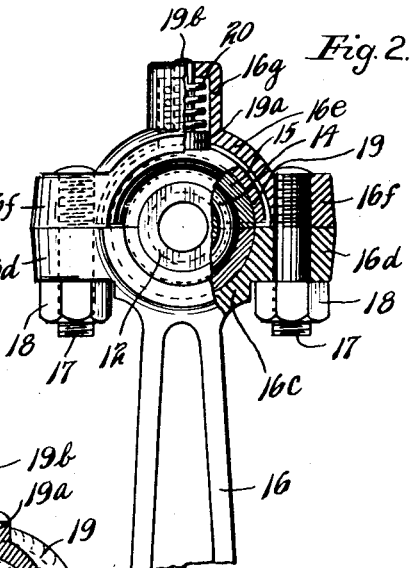
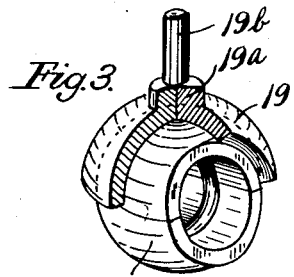
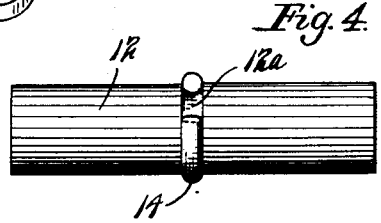
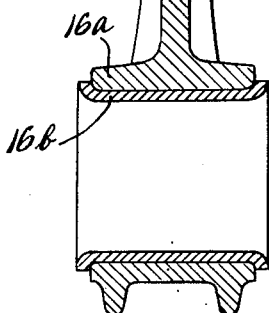
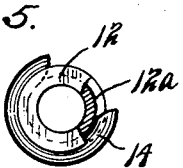
Inventor
LEO J. McKONE
By his Attorneys Patented Sept. 27, 1927.

1,643,720

UNITED STATES PATENT OFFICE.

LEO J. McKONE, OF MINNEAPOLIS, MINNESOTA.

CONNECTING-ROD STRUCTURE.

Application filed February 9, 1927. Serial No. 166,955. REISSUED

This invention relates to an internal combustion engine, especially to such an engine of the high speed type such as used in automobiles and airplanes, and the invention is particularly directed to the wrist pin and connecting rod structure of such an engine. It is well known to those skilled in the art, that theoretically the axes of wrist pin and crank shaft bearings should be exactly perpendicular to the axis of said cylinder bore. In spite of past efforts of engine builders, however, the axis of the wrist pin is not always exactly perpendicular to the axis of the piston or cylinder bore. This condition causes the connecting rod axis to be thrown out of the plane passing through the axes of the piston and cylinder and which is perpendicular to the axis of the crank shaft. The connecting rod thus tends to cant the piston and the piston bears more strongly against the wall of the cylinder on one side than on the other, thus resulting in an unequal wear on the piston and in scoring and scratching of the cylinder and piston. The pistons are often slightly canted so as to bear unevenly on the cylinder walls through the uneven expansion thereof, and there is often enough movement between the walls of the piston and cylinder for the connecting rod to rock the piston slightly when it reverses its stroke. This results in what is generally known as "piston slap" and this is the result of mal-alinement of the cylinder, piston and connecting rod. Such piston and cylinder troubles are now very common in automobiles and so affect the cylinders and pistons that refitting of the pistons and reboring of the cylinders is frequently necessary. This invention is an improvement upon that disclosed and claimed in a prior Patent 1,491,155, granted to applicant April 22, 1924. With the structure disclosed in said patent, the piston slap is eliminated. It is desirable, however, that a close fit be maintained between the connecting rod and the wrist pin. If the bearing on the connecting rod which engages the wrist pin becomes worn so as to cause a little play, an objectionable knock or slap will occur if the piston moves slightly laterally.

It is an object of this invention, therefore, to provide a piston, connecting rod and wrist pin structure which will permit of lateral movement of the connecting rod without moving the piston and will at all times maintain a firm bearing of the connecting rod on the wrist pin.

It is another object of the invention to provide a piston having a wrist pin with a semi-spherical bearing and a connecting rod having a semi-spherical bearing engaging the bearing on said wrist pin, a portion of the connecting rod bearing being yieldable.

It is more specifically an object of this invention to provide a passage having a wrist pin with a semi-spherical bearing thereon and a connecting rod having a bearing provided with a cap, a member in the cap forming part of the bearing on the wrist pin which is acted upon by resilient means in the cap for holding said member in firm engagement with the wrist pin.

It is also an object of the invention to provide a piston, connecting rod and wrist pin structure in which the connecting rod has a yielding bearing on the wrist pin.

These and other objects and advantages of the invention will be fully set forth in the following description made in connection with the accompanying drawings, in which like reference characters refer to similar parts throughout the several views and in which:—

Fig. 1 is a central section through the assembled piston and connecting rod;

Fig. 2 is a view in side elevation of the upper end of the connecting rod and wrist pin, a portion being broken away and other portions being shown in vertical section;

Fig. 3 is a perspective view partly in section of a portion of the connecting rod and wrist pin bearing;

Fig. 4 is a view in side elevation of the wrist pin showing the bearing holding means thereon partly in section;

Fig. 5 is an end view of the wrist pin with the portions shown in vertical section;

Fig. 6 is a view in side elevation of one form of holding means for the wrist pin bearing; and

Fig. 7 is a view of a modified form of such holding means.

Referring to the drawings, a piston such as used in an automobile engine is illustrated as 10 having therein piston ring grooves 10$^a$. The piston has bosses 10$^b$ adjacent its central portion one of which is bored to receive the sleeve or bushing 11. One of the bosses 10$^b$ is bored to receive the wrist pin 12 and the other boss is bored to a larger diameter to receive a sleeve or bushing 11, which sleeve 11 is bored to receive the other end of the wrist pin 12. The wrist pin 12 has a groove 12ª formed therein of semi-circular shape in cross section, which extends around said wrist pin, and a ring 14 such as shown in Fig. 6 is disposed in the groove 12ª. A semi-spherical bearing member 15 constructed in two halves is placed on the wrist pin 12 and has a circumferential groove at its central portion of semi-circular shape in cross section, which groove embraces the ring 14. The member 15 is made in two pieces and as shown in Figs. 1 and 3, has its outer surface of semi-spherical shape. The member 15 is embraced by the upper end of the connecting rod 16, said connecting rod having a hub 16ª at its lower end, bored to receive the bushing 16ᵇ in which the crank shaft is journaled. The connecting rod 16 has a lower bearing portion 16ᶜ which is formed on its inner surface to fit the member 15 and said bearing portion has oppositely projecting flanges 16ᵈ. A cap member 16ᵉ is provided for the connecting rod, having oppositely extending flanges 16ᶠ alining with and engaging the flanges 16ᵈ, said flanges being secured together by the studs 17 threaded into the flange 16ᶠ and being equipped with the nuts 18. The cap member 16ᵉ has a central upstanding boss bored to form the recess 16ᵍ and having a small hole extending through the top thereof. A member 19 is disposed within the cap 16ᵉ formed on its inner surface to fit the top of the member 15 and having a cylindrical portion 19ª fitting loosely in the recess 16ᵍ at the lower end thereof and having further a stem 19ᵇ extending centrally through the recess and through the opening in the top of the boss on cap 16ᵉ. A coiled compression spring 20 surrounds the stem 19ᵇ, bearing at one end against the top of the recess 16ᵍ and at its lower end against the shouldered top of the portion 19ª.

In assembling the device, the wrist pin 12 will have the ring 14 placed thereon, which ring, if desired, can be slightly expanded and moved over the end of the wrist pin and then compressed in the groove 12ª. The bearing 15 is then placed on the wrist pin and the wrist pin can be inserted through the opening in boss 10 which receives sleeve 11, the sleeve either being placed in said boss in the wrist pin or being subsequently placed in position. The members 19 and 20 are then placed in the cap 16ᵉ and the cap placed over the member 15 and engaged with the lower portion of the connecting rod. The nuts 18 are then placed on the studs 17 and the same tightened. The piston and connecting rod are then assembled.

In operation the piston 10 will be reciprocated by the explosions in the engine cylinder and the connecting rod will revolve at its lower end with the crank shaft. Should any lateral movements occur in the piston, they can be accommodated by the member 15 rocking inside of the semi-spherical bearings in the upper end of the connecting rod. The member 19 forms the upper bearing for the wrist pin or the member 15 and this member will always be held in firm engagement with the member 15 by the spring 20. There is no chance, therefore, for wear to occur around the member 15 or in the connecting rod bearing which might cause a knock or slap in lateral movements of the piston. The member 19 is held in proper position by the members 19ª and 19ᵇ. The connecting rod, wrist pin and piston thus function perfectly and silently. The structure is especially designed for very high speed engines such as now used on airplanes and high speed automobiles.

If desired, two rings such as shown as 21 in Fig. 7, can be placed in the groove 12ª of the wrist pin and the member 15 placed over these rings.

From the above description it is seen that applicant has provided a very simple and efficient structure of piston, wrist pin and connecting rod and one which will accommodate all the piston movements which might occur. At the same time a perfect bearing will always be maintained between the connecting rod and wrist pin.

In some modern pistons there is a large opening in the side so that the piston has very little, if any, bearing on the cylinder below the ring grooves or in the skirt portion thereof. With such pistons, if the cylinder is out-of-round or the piston and cylinder are not perfectly alined, a rocking movement of the piston is caused which is liable to cause a piston slap. The firm bearing on the wrist pin caused by the spring 20 in applicant's device pressing on the member 19 retards this rocking movement of the piston so that the same is not quickly made and the slap is substantially eliminated.

Furthermore, with the yieldingly mounted portion 19 it is not necessary to machine the bearing in the connecting rod which bears on the wrist pin with minute accuracy. The semi-spherical bearing in the connecting rod on the lower portion of the wrist pin can be coined. The bearing surface of the member 19 also need not be machined with great accuracy. The same will wear and take the shape of the wrist pin bearing as will also the lower portion of the connecting rod. At the same time, a firm and perfect bearing will be maintained.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. In combination with an engine cylinder, a piston adapted to move therein, a wrist pin journaled therein, a semi-spherical bearing intermediate the ends of said wrist pin, and a connecting rod having a semi-spherical bearing fitting over said bearing, said semi-spherical bearing on the connecting rod having a yieldingly mounted portion.

2. In combination with an engine cylinder, a piston adapted to move therein, a wrist pin journaled therein, a semi-spherical bearing intermediate the ends of said wrist pin, and a connecting rod having a rigid lower portion with a semi-spherical bearing fitting over said semi-spherical bearing on the wrist pin and having a resiliently mounted upper portion connected thereto fitting over the top of the semi-spherical bearing on the wrist pin.

3. In combination with an engine cylinder, a piston adapted to move therein, a wrist pin journaled therein, a semi-spherical bearing intermediate the ends of said wrist pin, a connecting rod having a semi-spherical bearing fitting over said bearing on the wrist pin and a member resiliently mounted in said connecting rod forming a part of the semi-spherical bearing thereof.

4. In combination with an engine cylinder, a piston adapted to move therein, a wrist pin journaled therein, a semi-spherical bearing intermediate the ends of said wrist pin, a connecting rod, a cap on said rod, a member carried in said cap bearing against said semi-spherical bearing on said wrist pin, and resilient means in said cap constantly urging said member against said wrist pin bearing.

5. A connecting rod having a lower semi-spherical bearing fitting over a portion of the semi-spherical bearing on said wrist pin, a cap for said connecting rod having a recess formed therein, a member carried in said cap having a semi-spherical bearing fitting over the other part of said semi-spherical bearing on the wrist pin, said member having a portion extending through said recess and a spring in said recess bearing upon said member to hold the same in engagement with said semi-spherical bearing on the wrist pin.

In testimony whereof I affix my signature.

LEO J. McKONE.